(12) United States Patent
Topich et al.

(10) Patent No.: US 11,733,181 B1
(45) Date of Patent: Aug. 22, 2023

(54) IMAGING ENVIRONMENT TESTING FIXTURE AND METHODS THEREOF

(71) Applicant: SAEC/Kinetic Vision, Inc., Cincinnati, OH (US)

(72) Inventors: James Anthony Topich, Mason, OH (US); Alexander Gregory Doukas, Cincinnati, OH (US); Geoffrey Allen King, Mt. Sterling, OH (US); Jeffrey Allen Hatton, Fairfield, OH (US)

(73) Assignee: SAEC/Kinetic Vision, Inc., Cincinnati, OH (US)

( * ) Notice: Subject to any disclaimer, the term of this patent is extended or adjusted under 35 U.S.C. 154(b) by 323 days.

(21) Appl. No.: 16/876,512

(22) Filed: May 18, 2020

Related U.S. Application Data

(60) Provisional application No. 62/856,927, filed on Jun. 4, 2019.

(51) Int. Cl.
*G01N 23/046* (2018.01)
*G01N 3/16* (2006.01)

(52) U.S. Cl.
CPC .......... *G01N 23/046* (2013.01); *G01N 3/165* (2013.01); *G01N 2223/321* (2013.01)

(58) Field of Classification Search
CPC . G01N 23/046; G01N 3/165; G01N 2223/321
See application file for complete search history.

(56) References Cited

U.S. PATENT DOCUMENTS

| | | | |
|---|---|---|---|
| 5,615,244 A | 3/1997 | Dykster et al. | |
| 8,804,905 B2 | 8/2014 | Christoph et al. | |
| 9,390,324 B1 | 7/2016 | Ariga et al. | |
| 9,488,604 B2 | 11/2016 | Wuestenbecker | |
| 10,139,355 B1* | 11/2018 | Li | G01N 23/046 |
| 2016/0282286 A1* | 9/2016 | Mashita | G01B 15/06 |
| 2018/0120242 A1 | 5/2018 | Takahashi et al. | |
| 2019/0056796 A1 | 2/2019 | Ng et al. | |
| 2019/0223826 A1 | 7/2019 | Asano et al. | |
| 2019/0227004 A1 | 7/2019 | Ariga et al. | |
| 2019/0277780 A1* | 9/2019 | Asano | G01N 23/083 |
| 2020/0300785 A1* | 9/2020 | Arzoumanidis | G01N 23/18 |

FOREIGN PATENT DOCUMENTS

| | | | | |
|---|---|---|---|---|
| CN | 206740672 U | 12/2017 | | |
| EP | 2322908 A1 * | 5/2011 | | G01M 99/002 |
| JP | 3427046 B2 | 5/2003 | | |
| JP | 2004012407 A | 1/2004 | | |
| WO | 2018068775 A | 5/2018 | | |
| WO | 20090127169 A * | 7/2022 | | G01N 35/00029 |
| WO | WO-2022159676 A1 * | 7/2022 | | G01N 35/00029 |

* cited by examiner

*Primary Examiner* — Christine S. Kim
(74) *Attorney, Agent, or Firm* — Frost Brown Todd LLP

(57) ABSTRACT

Systems and methods are provided for allowing users to safely and efficiently conduct repeatable dynamic experiments involving coordinated applications of force, motion, pressure, temperature, flow, dispersion and other physical events via a testing fixture positioned within an imaging environment.

22 Claims, 14 Drawing Sheets

IMAGING ENVIRONMENT TESTING FIXTURE AND METHODS THEREOF

CROSS-REFERENCE TO RELATED APPLICATION

This application claims the benefit of U.S. provisional patent application Ser. No. 62/856,927, filed on Jun. 4, 2019, entitled UTILIZATION OF TESTING FIXTURES AND CONTROL SOFTWARE FOR DYNAMIC EXPERIMENTATION WITHIN IMAGING ENVIRONMENTS, the disclosure of which is incorporated herein by reference in its entirety.

BACKGROUND

The collection of imaging data for a subject device is useful for a variety of purposes. For example, image data collection can be used in product testing and product design. Various types of industrial computed tomography machines use X-rays to collect such imaging data. The amount of radiation found in some of these machines is significantly stronger than those used for medical purposes. Due to the physical risks of human absorption of X-rays and other imaging waves and/or other operational constraints, the subject device is typically placed in an enclosure of the image collection device prior to image collection. Should the subject device need to be manipulated, the computed tomography machine must cease collecting images so that the subject device can be manually manipulated. Once the subject device has been manually adjusted, a subsequent image can then be collected. This process must be repeatedly performed in a manually intensive and time consuming approach that still only collects a series of static images of the subject device under test. As conventional manual adjustment methods only produce static experimentation data in a slow and manually intensive manner, there is a need for an efficient, accurate, and safe system for conducting dynamic experiments within imaging environments that will allow users to visualize and gather data from consistent, repeatable, and dynamic tests.

BRIEF DESCRIPTION OF THE DRAWINGS

The present disclosure will be more readily understood from a detailed description of some example embodiments taken in conjunction with the following figures.

DETAILED DESCRIPTION

Figure 1:
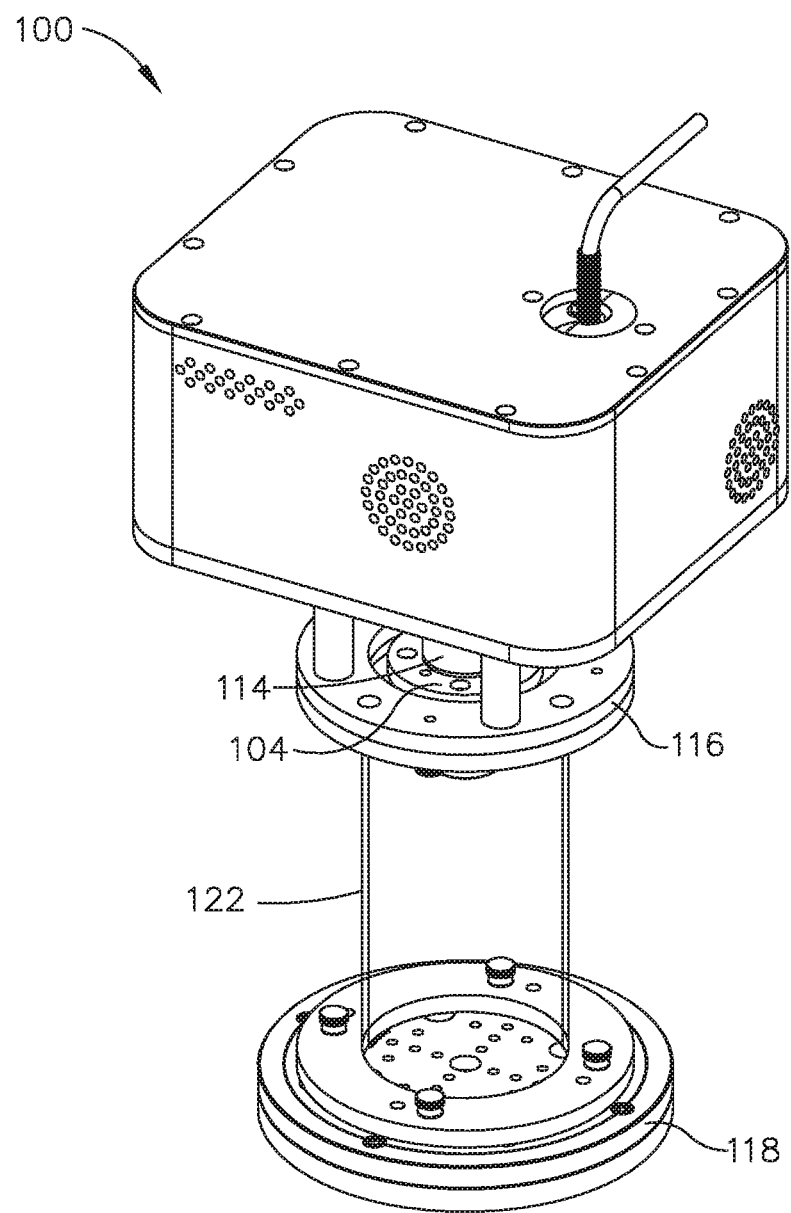
FIG. 1 is an isometric view of a testing fixture in accordance with one non-limiting embodiment.

Various non-limiting embodiments of the present disclosure will now be described to provide an overall understanding of the principles of the structure, function, and use of testing fixtures and associated control systems as disclosed herein. One or more examples of these non-limiting embodiments are illustrated in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term software is used expansively to include not only executable code, but also data structures, data stores, and computing instructions in any electronic format, firmware, and embedded software. The terms information and data are used expansively and can include a wide variety of electronic information, including but not limited to machine-executable or machine-interpretable instructions; content such as text, video data, and audio data, among others; and various codes or flags. The terms information, data, and content are sometimes used interchangeably when permitted by context.

The examples discussed herein are examples only and are provided to assist in the explanation of the systems and methods described herein. None of the features or components shown in the drawings or discussed below should be taken as mandatory for any specific implementation of any of these systems and methods unless specifically designated as mandatory. For ease of reading and clarity, certain components, modules, or methods may be described solely in connection with a specific figure. Any failure to specifically describe a combination or sub-combination of components should not be understood as an indication that any combination or sub-combination is not possible. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

With the growing adoption of imaging technologies within industrial and commercial markets, a need exists for the ability to study products and components while they are functioning instead of obtaining only static information. The systems and methods of the present disclosure can allow users to quickly set up and conduct repeatable dynamic experiments. By way of non-limiting example, such experiments can involve the study or investigation of mechanical force or motion, fluid flow, particle movement, physical wear, temperature and other time-varying events. Such experimentation can be performed with X-ray compatible equipment physically positioned within imaging environments, which the user can control externally via control software communication.

Moreover, the present disclosure generally relates to combining X-ray technology, computed tomography (CT) and/or other scanning technologies (collectively, "imaging environments") with customized electromechanical systems (hereafter, "testing fixtures") and associated user control software. As described in more detail below, in accordance with the present disclosure, users can safely and efficiently conduct repeatable dynamic experiments involving coordinated applications of force, motion, pressure, temperature, flow, dispersion and/or other physical events via an electromechanical testing fixture within an imaging environment, which the user controls externally by control software communication. Thus, the present disclosure provides systems and methods for combining imaging environment technologies with customized electromechanical fixtures to create controlled forces and motions utilizing control software to conduct safe and remotely operated dynamic experiments for data acquisition and output. Using testing fixtures, in accordance with the present disclosure, for non-destructive or destructive testing analysis enables controlled movement of a product during the CT scanning operation. Product behavior under stress conditions that replicates real-world scenarios can be shown, which can save significant time and cost in the product development process.

As is to be appreciated upon consideration of the present disclosure, the testing fixtures with the associated control software described herein can allow users to quickly set up and control repeatable dynamic experiments within an imaging environment. Various physical components of the testing fixture within the field of view within the imaging environment can be X-Ray compatible. Testing fixtures can also allow for linear and torsional tests during X-ray scanning as well as 4D dynamic scanning with products mounted in the testing fixture that can yield near infinite data sets on product behavior.

Moreover customized control software can ensure a replicable movement/force pattern to help control variables across multiple tests, for example. Thus, a wide array of testing can be performed using testing fixtures in accordance with the present disclosure such as, without limitation, linear loading, rotational and torque loading, pressure/vacuum-based testing, temperature and humidity testing, combinations of rotational and linear testing, as well as fluid dosing.

Testing fixtures in accordance with the present disclosure can utilize custom microcontrollers as well as stepper motors and a load cell to generate torsion and linear force-feedback. In some embodiments, over-torque sensors can be utilized to stop the device if operating beyond calibrated limits. Furthermore, a computing system (such as a laptop computer, tablet computer, mobile communications device, etc.) can provide a user interface allowing a user to set up the testing fixture, create motion profiles, and execute repeatable experimentation. Associated software can be coded for hardware control and ability to read, capture, and export data for interpretation by the user.

Figure 2:
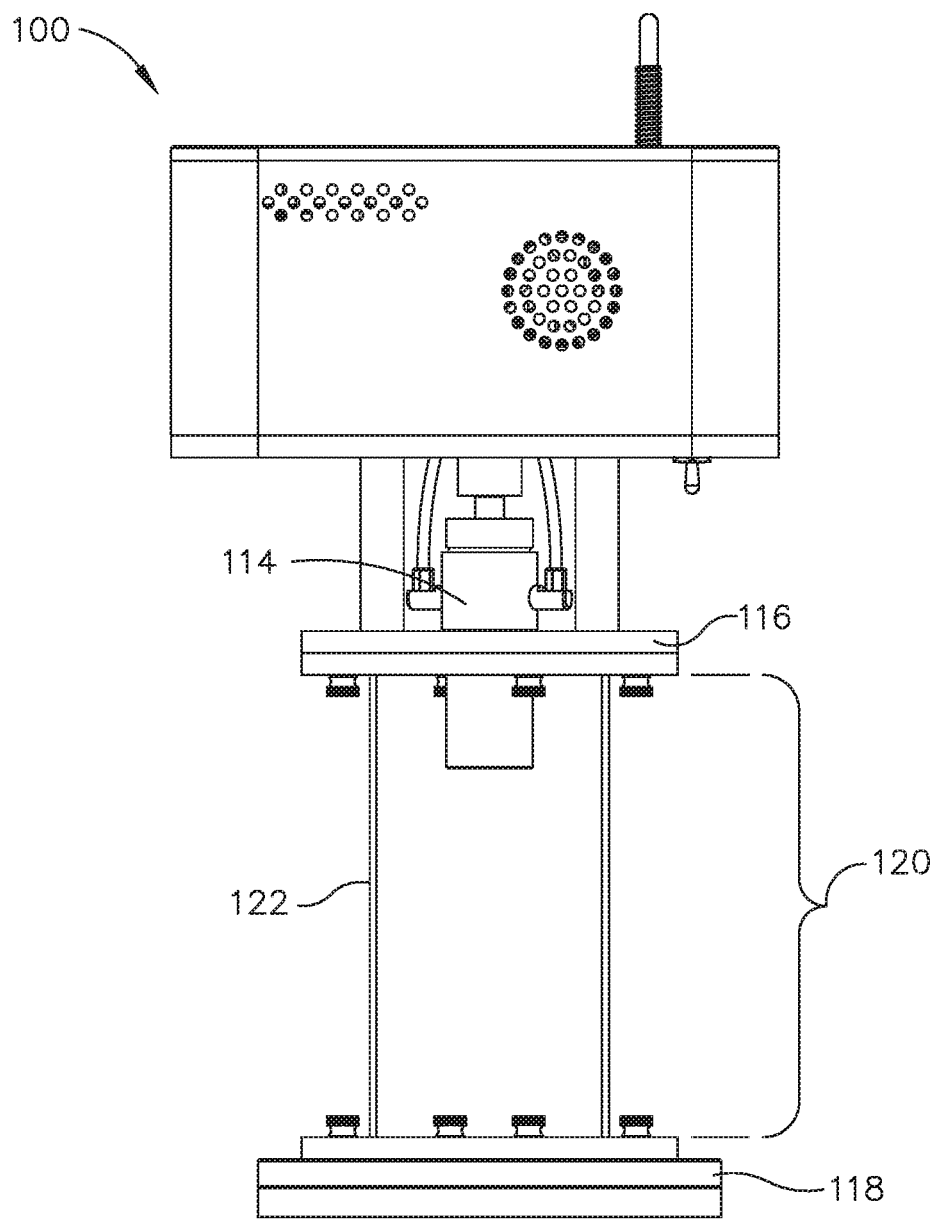
FIG. 2 is a side elevation view of the testing fixture of FIG. 1.
Figure 3:
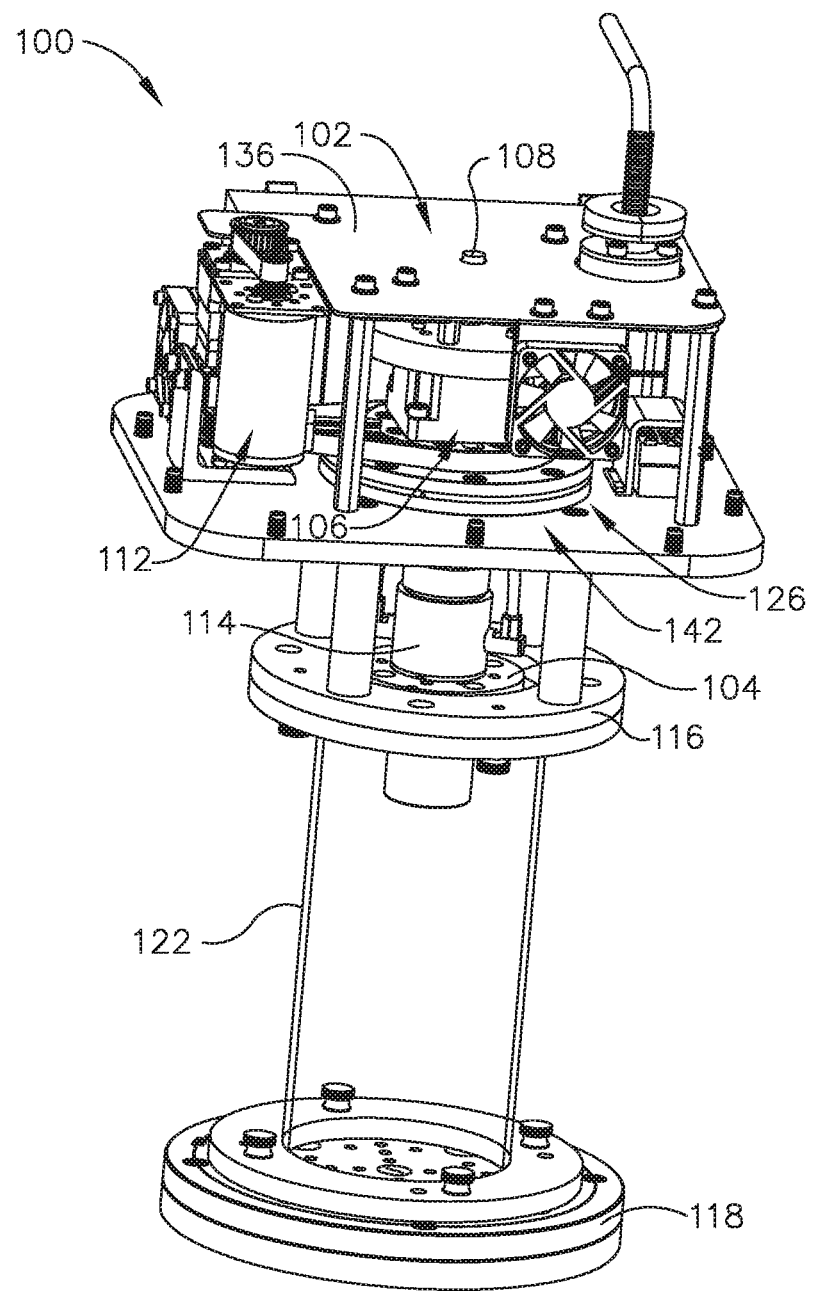
FIG. 3 is an isometric view of the testing fixture of FIG. 1 with various components removed for clarity.
Figure 4:
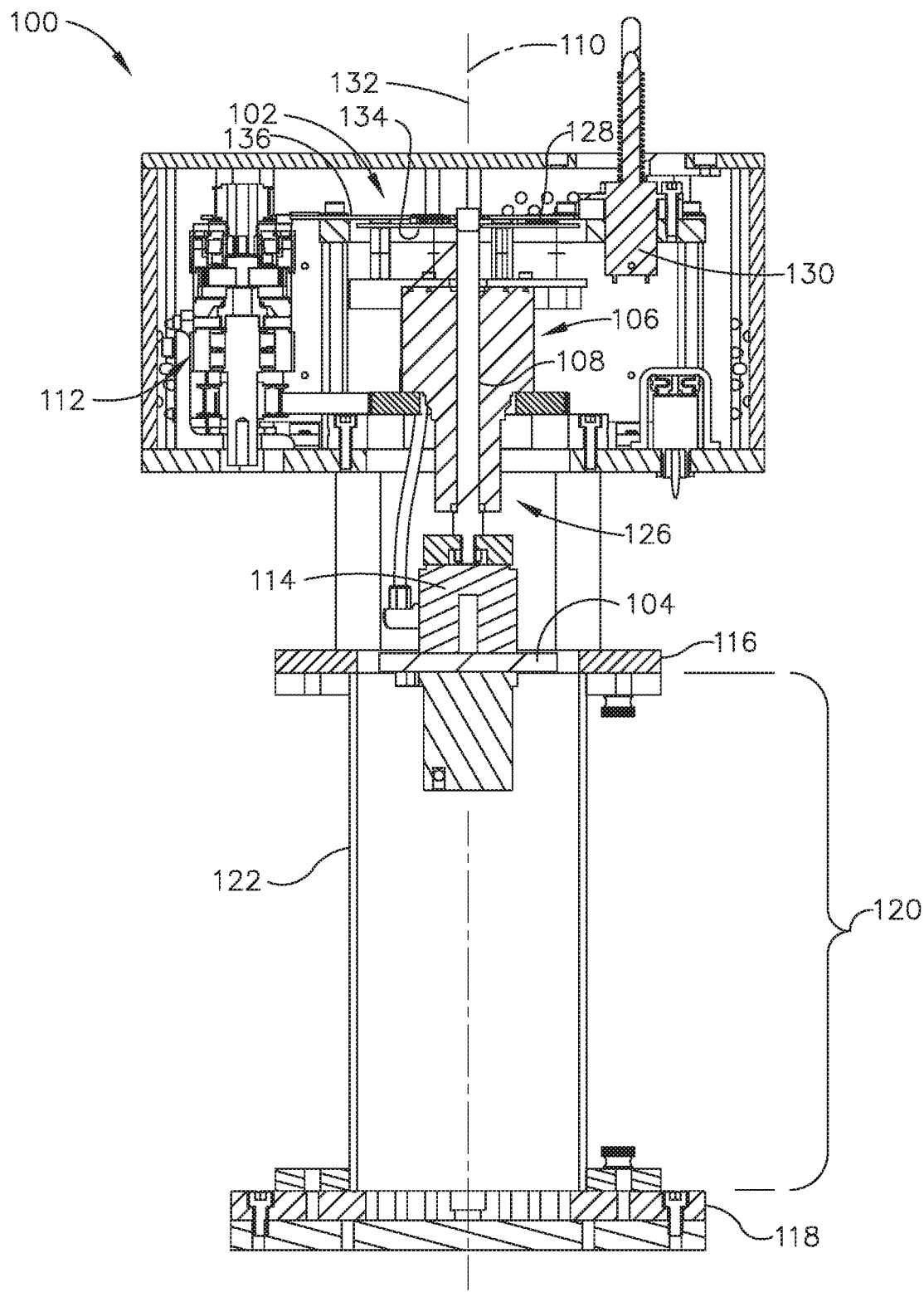
FIG. 4 is a cross-sectional view of the testing fixture of FIG. 1.
Figure 5:
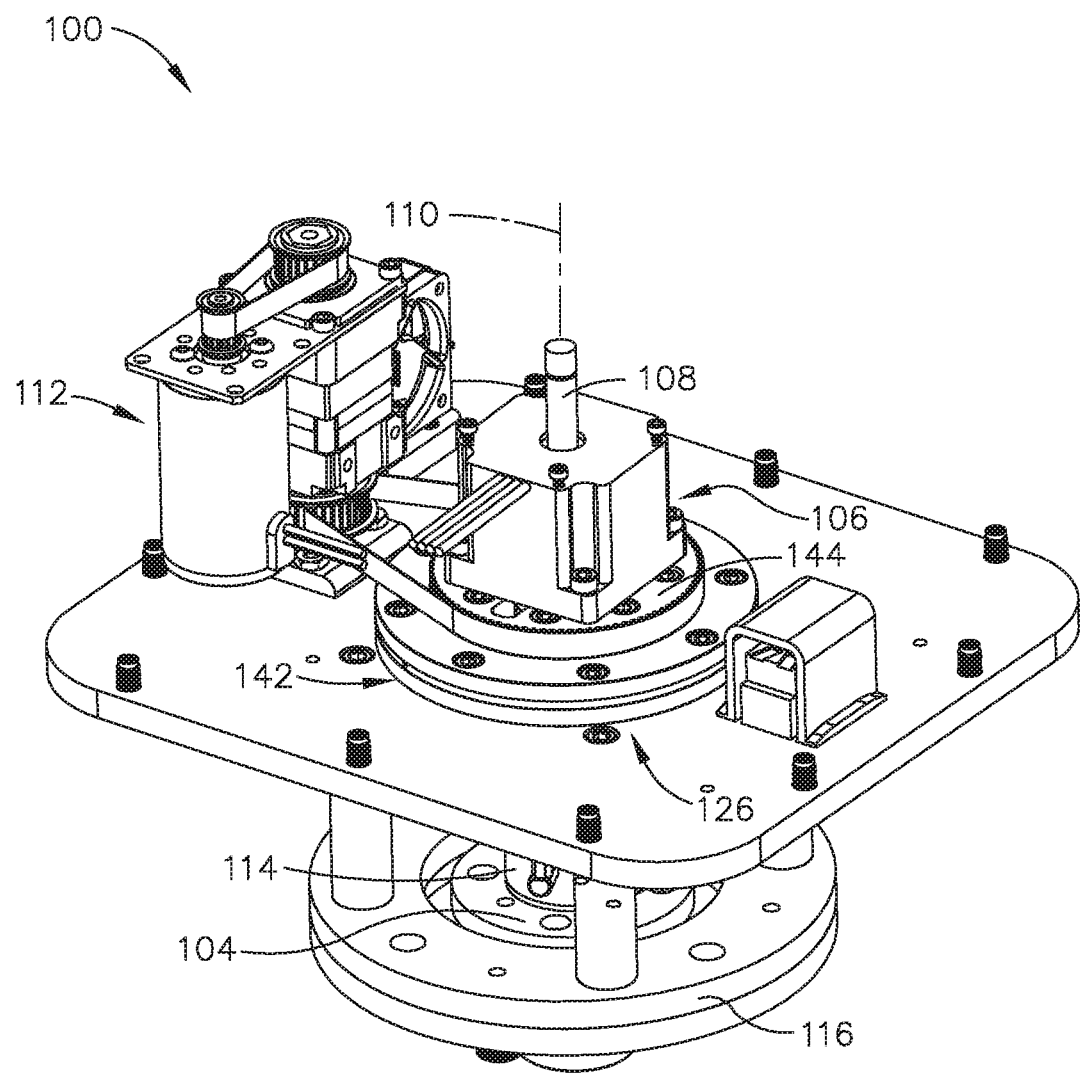
FIG. 5 is an isometric view of the testing fixture of FIG. 1 with various components removed for clarity.
Figure 6:
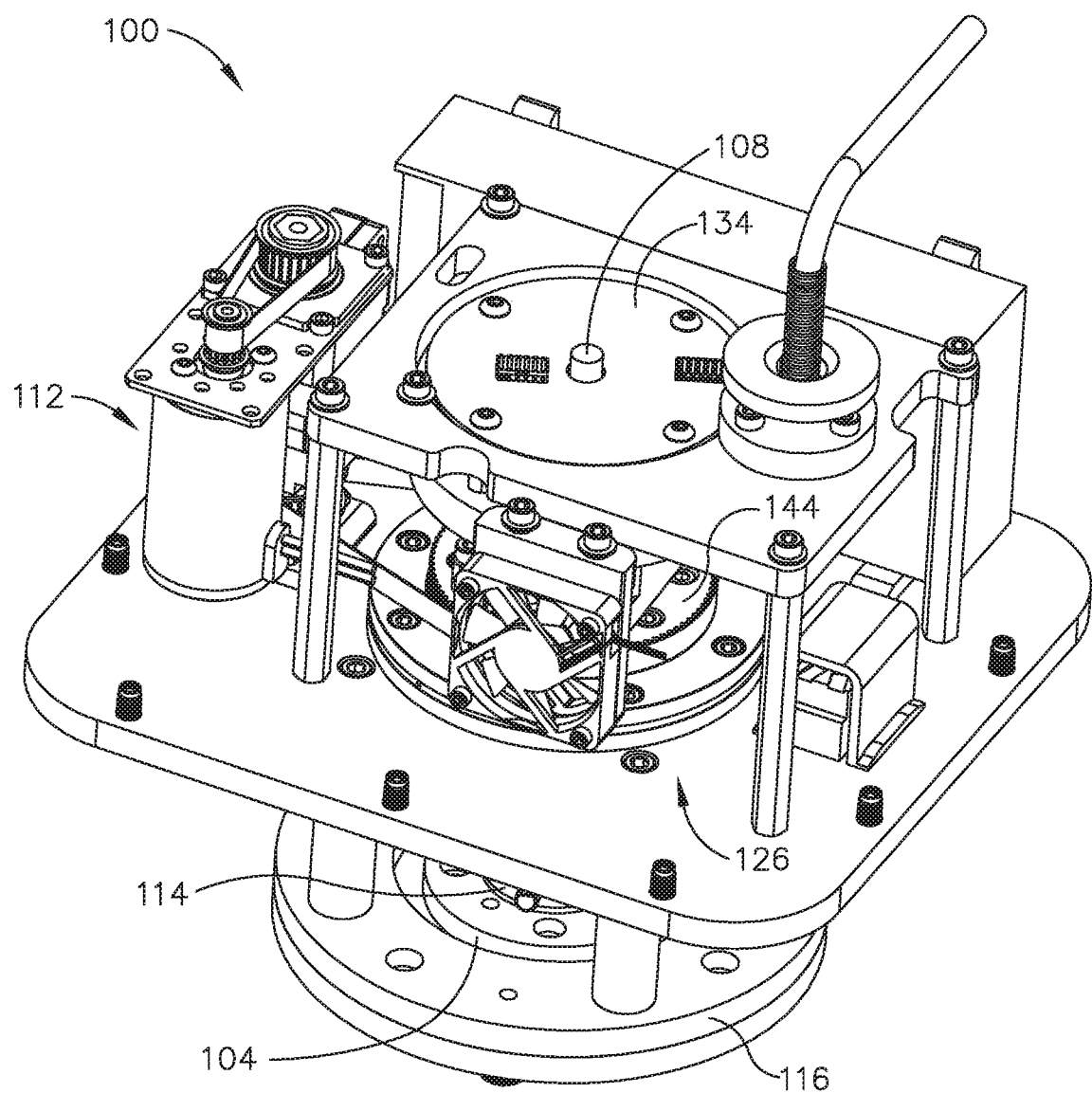
FIG. 6 is an isometric view of the testing fixture of FIG. 1 with various components removed for clarity.

Referring now to FIGS. 1-6, an example testing fixture 100 in accordance with one non-limiting embodiment is depicted. FIG. 1 is an isometric view of the testing fixture 100. FIG. 2 is a side elevation view of the testing fixture 100. FIG. 3 is an isometric view of the testing fixture 100 with various components removed for clarity. FIG. 4 is a cross-sectional view of the testing fixture 100. FIG. 5 and FIG. 6 are isometric view of the testing fixture 100 with various components removed for clarity. The testing fixture 100 can include a mounting assembly 104 to which a product can be selectively coupled by a user. As used herein, "product" broadly refers to any device, system, apparatus, or other unit that is to be tested using the functionality of the testing fixture 100. In some embodiments, specialized fixturing, sometimes referred to as a part adaptor, can by utilized to facilitate coupling a product, or other component, to the mounting assembly 104. A control system 102 can generally control the operation of the testing fixture 100. In some embodiments, the control system 102 comprises one or more microcontrollers or other forms of control circuitry. The control system 102 can generally receive communications from an associated computing system (such as computing system 264 in FIG. 8) and operate various motors, actuators, etc. of the testing fixture 100 to execute various motion profiles.

In one embodiment, the testing fixture 100 can have a linear actuator assembly 106 that is communicatively coupled to the control system 102. The linear actuator assembly 106 can have an actuator 108 and can define a longitudinal axis 110. The actuator 108 can be operatively coupled to the mounting assembly 104 and facilitate selective translation of the mounting assembly 104 along the longitudinal axis 110, based on signaling received from the control system 102. The linear actuator assembly 106 can also be rotatable about the longitudinal axis 110.

Additionally or alternatively, in various embodiments the testing fixture 100 can include a motor 112. The motor 112 can be, for example, a rotary DC motor having a 10:1 planetary gearbox and an inline encoder, although any suitable motor can be used. The motor 112 can be communicatively coupled to the control system 102 and facilitate selective rotation of the mounting assembly 104 about the longitudinal axis 110.

The testing fixture 100 can further comprise a load cell 114 operatively coupled to the mounting assembly 104. The load cell 114 can be communicatively coupled to the control system 102 and generate torsion and linear force-feedback, for example. Generally, the load cell 114 can be a force torque sensor designed to measure reaction torque moments as well as tension/compression loads at the same time. In some embodiments, the torque and thrust sensor is metal foil strain gauge based and has two separate outputs for applied torque as well as thrust force. Further, a 2-axis load cell in accordance with some embodiments can measure torque in clockwise and counterclockwise directions, as well as force in tension and compression directions. Accordingly, as a product is being manipulated by the one or both of the linear actuator assembly 106 and the motor 112, the load cell 114 can generate signals corresponding to torsion feedback and/or linear force feedback.

Figure 7:
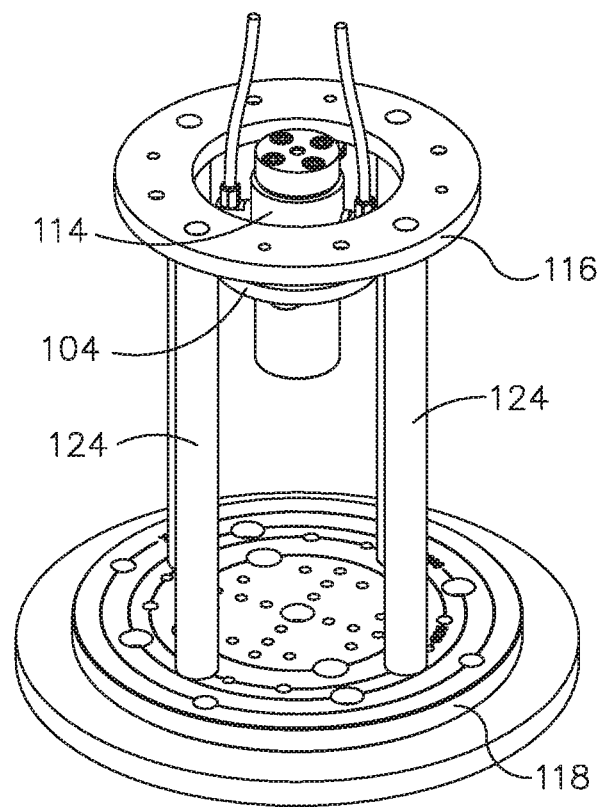
FIG. 7 depicts an example testing fixture having spacer rods in accordance with one non-limiting embodiment.

In some embodiments, the testing fixture 100 can further include a first plate 116 and a second plate 118. The second plate 118 can be spaced from the first plate 116 along the longitudinal axis 110 to define a target scan zone 120 positioned between the first plate 116 and the second plate 118. In some embodiments, specialized fixturing can be coupled to the second plate 118 to which the produce or device being testing can be mounted. The second plate 118 can remain stationary as the mounting assembly 104 is linearly actuated and/or rotated. In some embodiments, at least a portion of the mounting assembly 104, or at least a portion of a part adaptor that couples a product to the mounting assembly, can be positioned within the target scan zone 120. As is to be readily appreciated, each of the first and second plate 116, 118 can have any suitable size or structure. Further, in some embodiments a shroud 122 is positioned between the first plate 116 and the second plate 118. The shroud 122 can be, for example, an acrylic flanged tube, as shown in FIGS. 1-4. Additionally or alternatively, the testing fixture 100 can have one or more spacer rods 124 extending from the first plate 116 to the second plate 118, as shown in FIG. 7. As with other various components of the testing fixture 100, the one or more spacer rods 124 can be polyoxymethylene (POM), or other suitable X-ray compliant materials. In one embodiment, the one or more spacer rods 124 are formed from DELRIN offered by DuPont de Nemours, Inc. In any event, the testing fixture 100 can generally be configured to receive a product between the first plate 116 and the second plate 118 for testing.

In order to facilitate various types of rotational-based testing, the testing fixture 100 can have a rotating assembly 126. The rotating assembly 126 can include various components, such as the mounting assembly 104, the linear actuator assembly 106, and the load cell 114. In some embodiments, the rotating assembly 126 includes a rotating printed circuit board 134, although this disclosure is not so limited. In some embodiments, the rotating assembly 126 can also include a slip ring connector 128 that allows the rotating assembly 126 to be in electrical communication with a power source 130, such as through a stationary printed circuit board 136. Further, the slip ring connecter 128 can define a slip ring axis of rotation 132. The slip ring axis of rotation 132 can be parallel, and in some embodiments coincidental, to the longitudinal axis 110.

In some embodiments, the testing fixture 100 has a rotating platform 142 that is operatively coupled to the motor 112 and the mounting assembly 104. The rotating platform 142 can facilitate selective rotation of the mounting assembly 104 about the longitudinal axis 110 with the motor 112. In some embodiments, the rotating platform 142 comprises a spur gear 144, although this disclosure is not so limited. For example, any suitable drive mechanism can be used, such as a worm gear, which can rotate the rotating platform 142. Furthermore, as depicted in FIG. 5, the linear actuator assembly 106 can be mounted to the rotating platform 142 such that they rotate together about the longitudinal axis 110.

Figure 8:
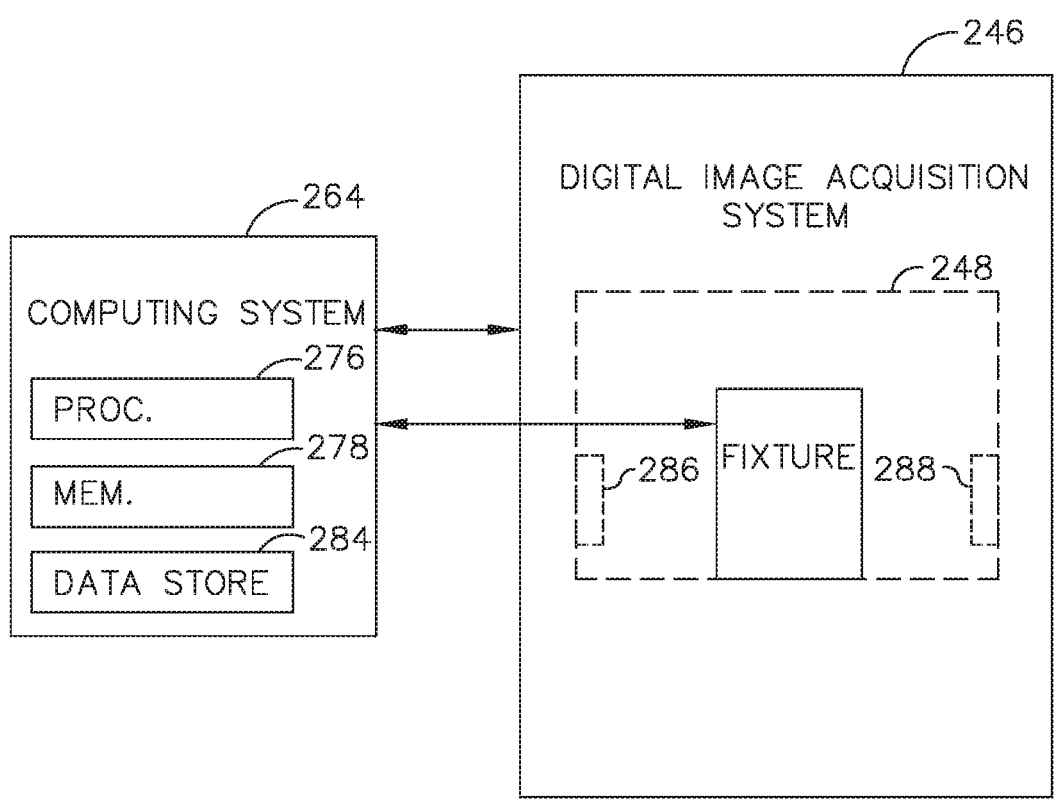
FIG. 8 schematically depicts an example testing fixture positioned in an enclosure of an example digital image acquisition system.

Referring now to FIG. 8, an example testing fixture 200 is shown positioned in an enclosure 248 of an example digital image acquisition system 246. The testing fixture 200 can be similar to the testing fixture 100 of FIGS. 1-6. In that regard, the testing fixture 200 can be configured to linearly drive a product or other device under test, rotate a product or other device under test, or perform a combination of both linear and rotational movements. As is to be appreciated, the digital image acquisition system 246 can be any X-ray imaging machine or any other scanning technologies that create imaging environments for product testing. In some embodiments the digital image acquisition system 246 is a computed tomography (CT) system having an emitter 286 and a detector 288. The target scan zone 120 (FIG. 2) of the testing fixture 200 can be placed between the emitter 286 and the detector 288.

As shown in FIG. 8, a computing system 264 can be in communication with the testing fixture 200. In some embodiments, the computing system 264 is also in communication with the digital image acquisition system 246. The computing system 264 can be provided using any suitable processor-based device or system, such as a personal computer, laptop, tablet, mobile communications device, wearable, server, or a collection (e.g., network) of multiple computers, for example. The computing system 264 can include one or more processors 276 and one or more computer memory units 278. For convenience, only one processor 276 and only one memory unit 278 are shown in FIG. 8. The processor 276 can execute software instructions stored on the memory unit 278. The processor 276 can be implemented as an integrated circuit (IC) having one or multiple cores. The memory unit 278 can include volatile and/or non-volatile memory units. Volatile memory units can include random access memory (RAM), for example. Non-volatile memory units can include read only memory (ROM), for example, as well as mechanical non-volatile memory systems, such as, for example, a hard disk drive, an optical disk drive, etc. The RAM and/or ROM memory units can be implemented as discrete memory ICs, for example.

The memory unit 278 can store executable software and data for the testing fixture 200. When the processor 276 of the computing system 264 executes the software, the processor 276 can be caused to perform the various operations of the computing system 264, such as cause the testing fixture 200 to execute various motion profiles and receive feedback data from the testing fixture 200, as may be collected by a load cell.

Data used by the computing system 264 can be from various sources, such as a data store 284. The data stored in the data store 284 can be stored in a non-volatile computer memory, such as a hard disk drive, a read only memory (e.g., a ROM IC), or other types of non-volatile memory. In some embodiments, one or more data stores 284 can be stored on a remote electronic computer system, for example. As is to be appreciated, a variety of other data stores, databases, or other types of memory storage structures can be utilized or otherwise associated with the computing system 264.

The computing system 264 can be any suitable computing system, such as a laptop computer, desktop computer, mobile communication device, tablet computer, wearable device, and so forth. Further, the computing system 264 can communicate with the testing fixture 200 using any suitable communication protocol or technique. In some embodiments, for example, a wired connection between the testing fixture 200 and the computing system 264 is utilized, whereas in others a wireless connection is used. The computing system 264 can be local to the digital image acquisition system 246 and the testing fixture 200 or can be a remote/cloud-based system that is in communication with the testing fixture through suitable network communications.

Figure 9:
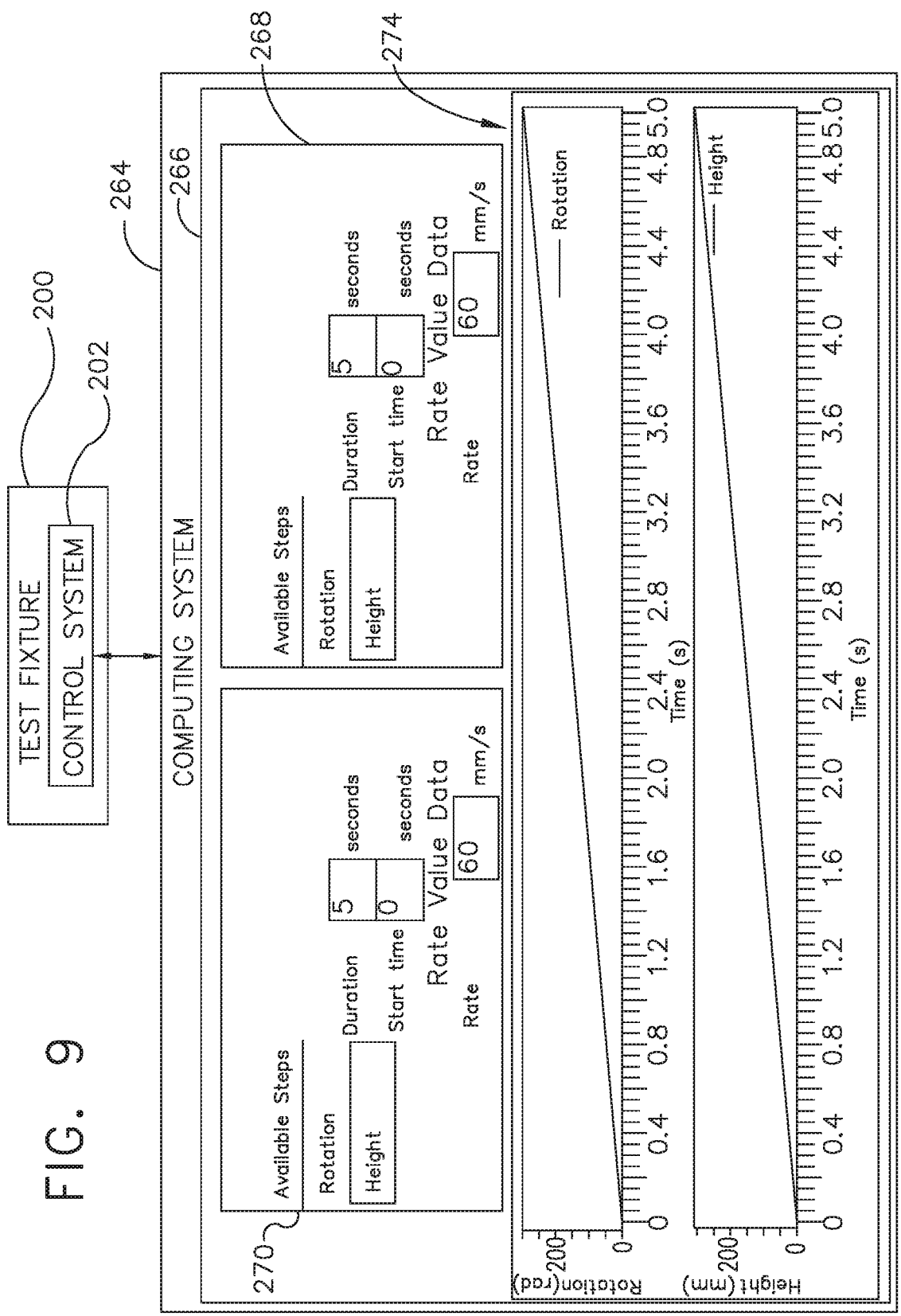
FIGS. 9-10 depict simplified example user interfaces in accordance with one non-limiting embodiment.
Figure 10:
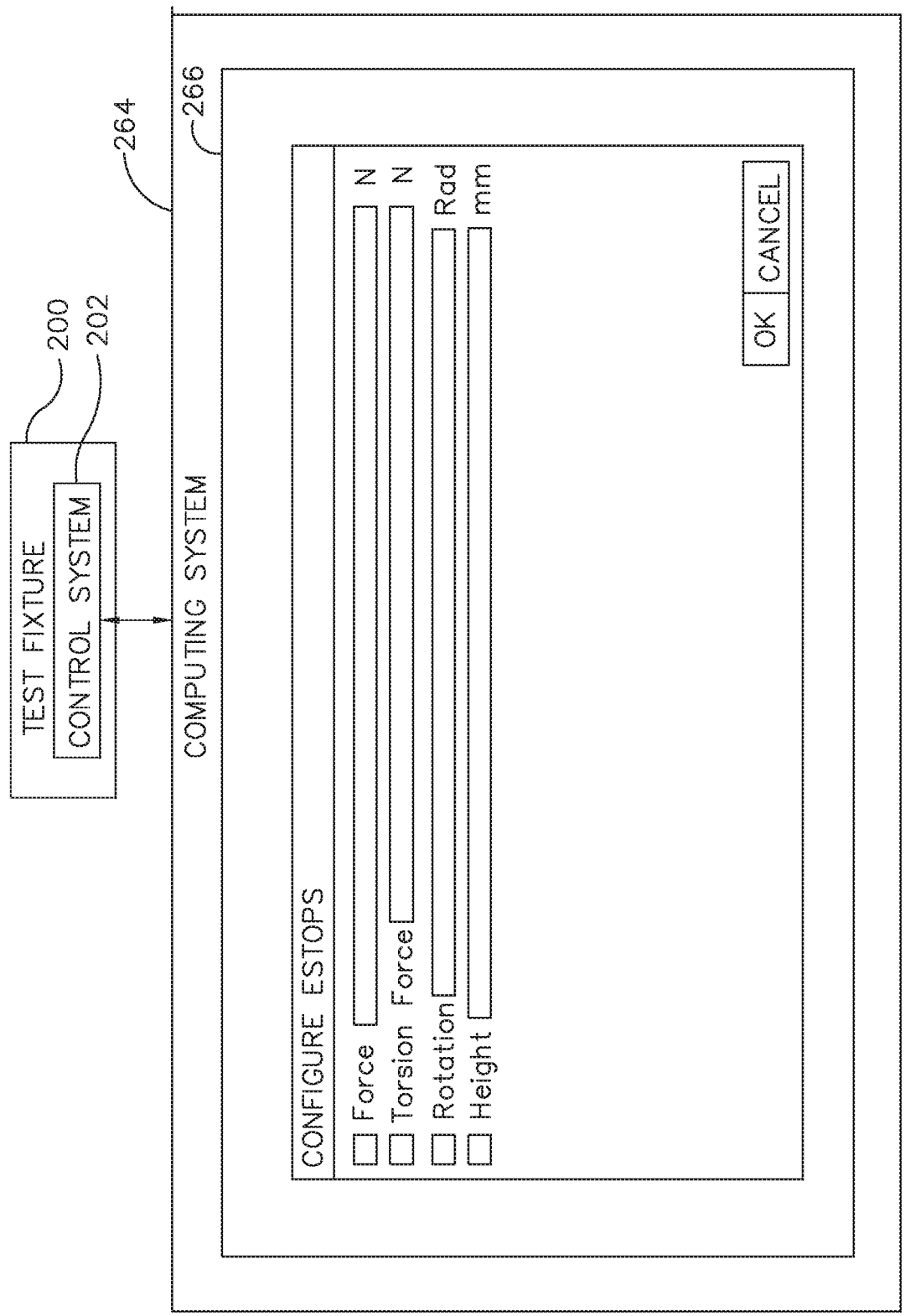

Referring now to FIGS. 9-10, an example user interface 266 of the computing system 264 is depicted. Through the use interface 266 a user can define specific motion profiles that can be communicated to a control system 202 of the testing fixture 200 for execution by one or more motion drivers. Referring to FIG. 9, the example illustrated motion profile 268 includes a rotation parameter 270 and a height parameter 272. It is to be appreciated, however, that some motion profiles may only have a rotation parameter and some may only have a height parameter. In the illustrated example, durations of particular movements are entered as well as the rate of speed of the movement. Other embodiments can define the motion profile using other suitable approaches without departing from the scope of the present disclosure. Further, the example user interface 266 also includes plots 274 visually representing the motion profile 268.

While FIG. 9 depicts a user creating a customized motion profile, in some embodiments, a user can retrieve one or more pre-made motion profiles from either a local or online repository of motion profiles. Once the motion profile 268 is defined, the mounting assembly of the testing fixture 200, similar to the mounting assembly 104 of testing fixture 100, can be driven accordingly. A load cell of the testing fixture 200, similar to the load cell 114 of testing fixture 100, can receive torsional and/or linear data that can be provided to and displayed and/or exported by the computing system 264. Notably, the motion profile 268 can be executed concurrently to the collection of images by the digital image acquisition system 246. Force feedback generated by a load cell of the testing fixture 200 can be graphically displayed concurrently with the dynamic X-ray images collected by the digital image acquisition system.

As shown in FIG. 10, in some embodiments, the testing fixture can be calibrated such that it will automatically stop if operating beyond its operational limits. For example, limits of various operational parameters, such as force, torsion force, rotation, and height, can be entered into the user interface 266. The user can optionally select none, some, or all, of the operational stops before executing a particular motion profile.

FIGS. 11A-11D depict an example testing fixture 300 in accordance with one non-limiting embodiment that is executing a customized motion profile. The testing fixture 300 is substantially similar to the testing fixture 100 of FIGS. 1-6, having a load cell 314 and motion drivers to linearly drive a product 380 and also rotationally drive the product 380. In this example embodiment, the product 380 is a lock and key. The key is coupled to the mounting assembly 304 (FIG. 11A) via a part adaptor 382, which is a specialized fixture to hold the key. As such, the key can be selectively rotated and linearly translated. Additionally another part adaptor 382 is utilized to couple the lock to the bottom plate 318. As is to be appreciated, the particular part adaptors 382 that are used can vary based on the geometries of the product under test.

Figure 11A:
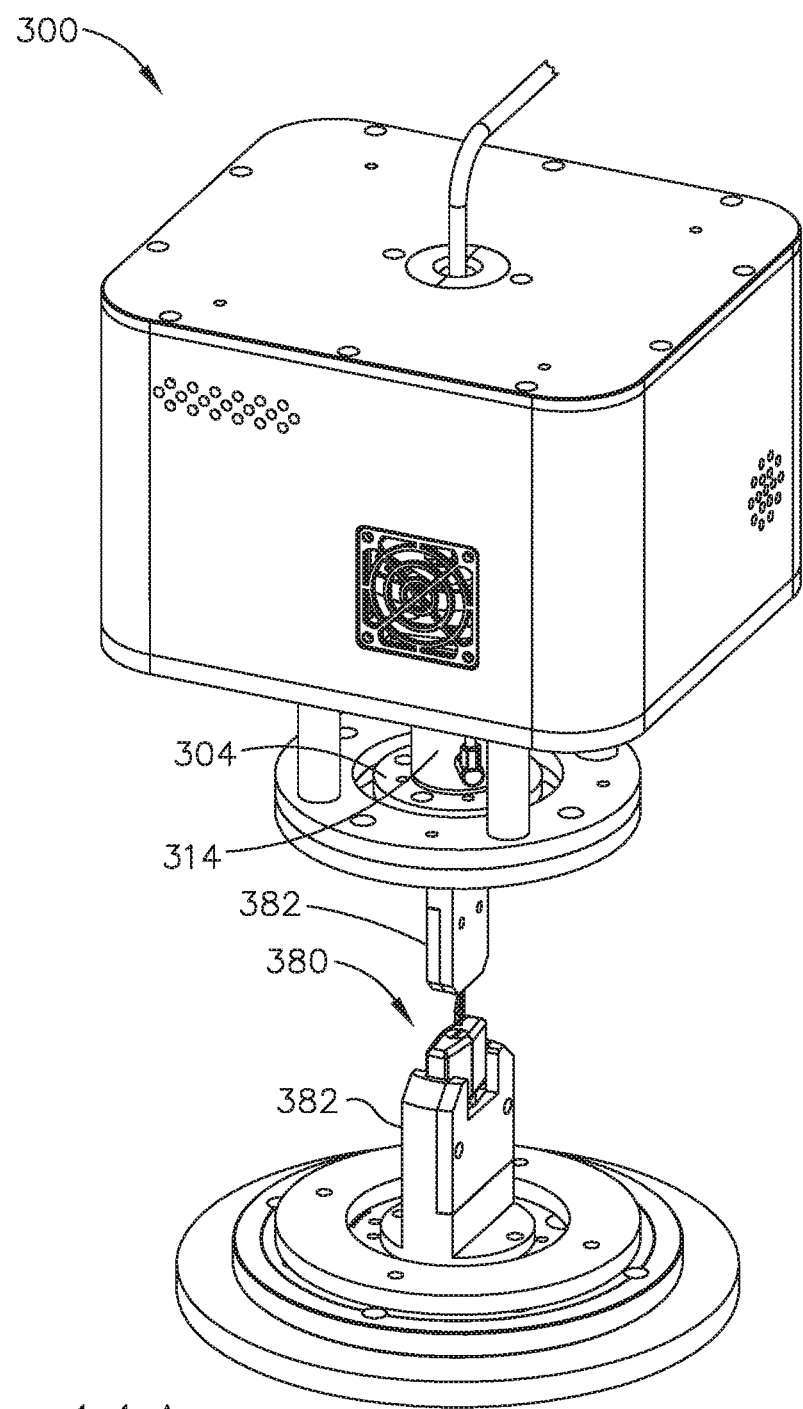
FIGS. 11A-11D depict an example testing fixture in accordance with one non-limiting embodiment that is executing a motion profile.
Figure 11B:
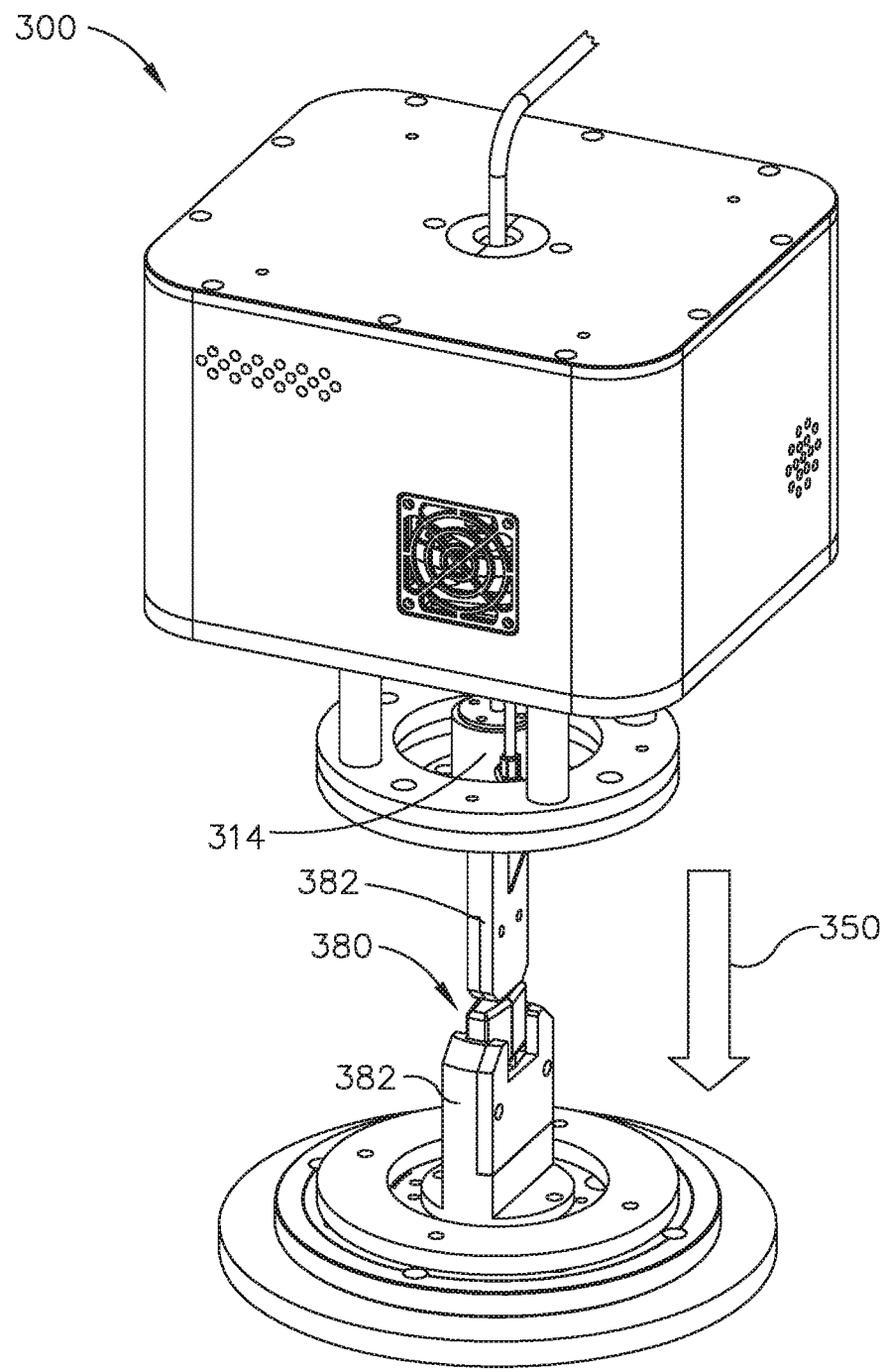
Figure 11C:
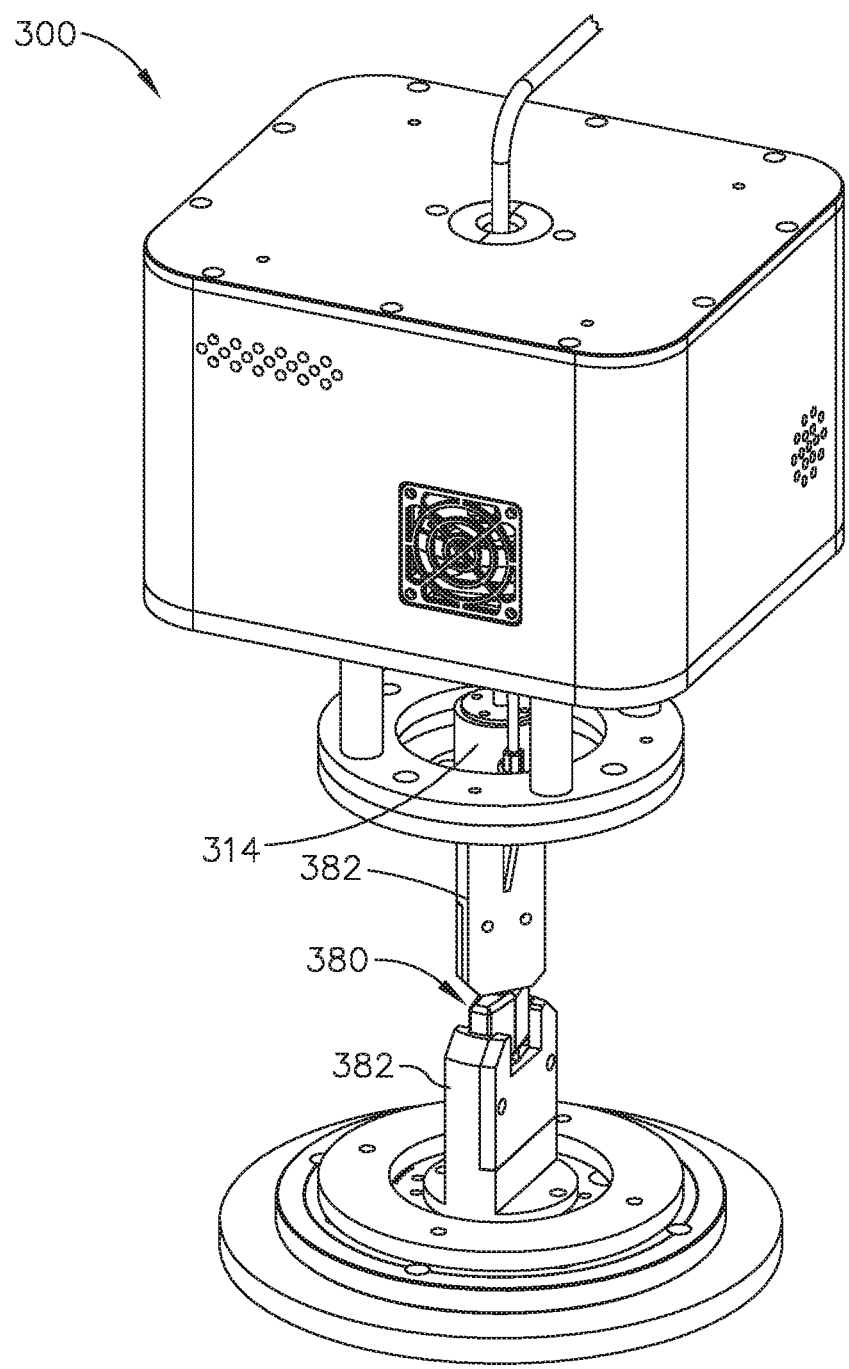
Figure 11D:
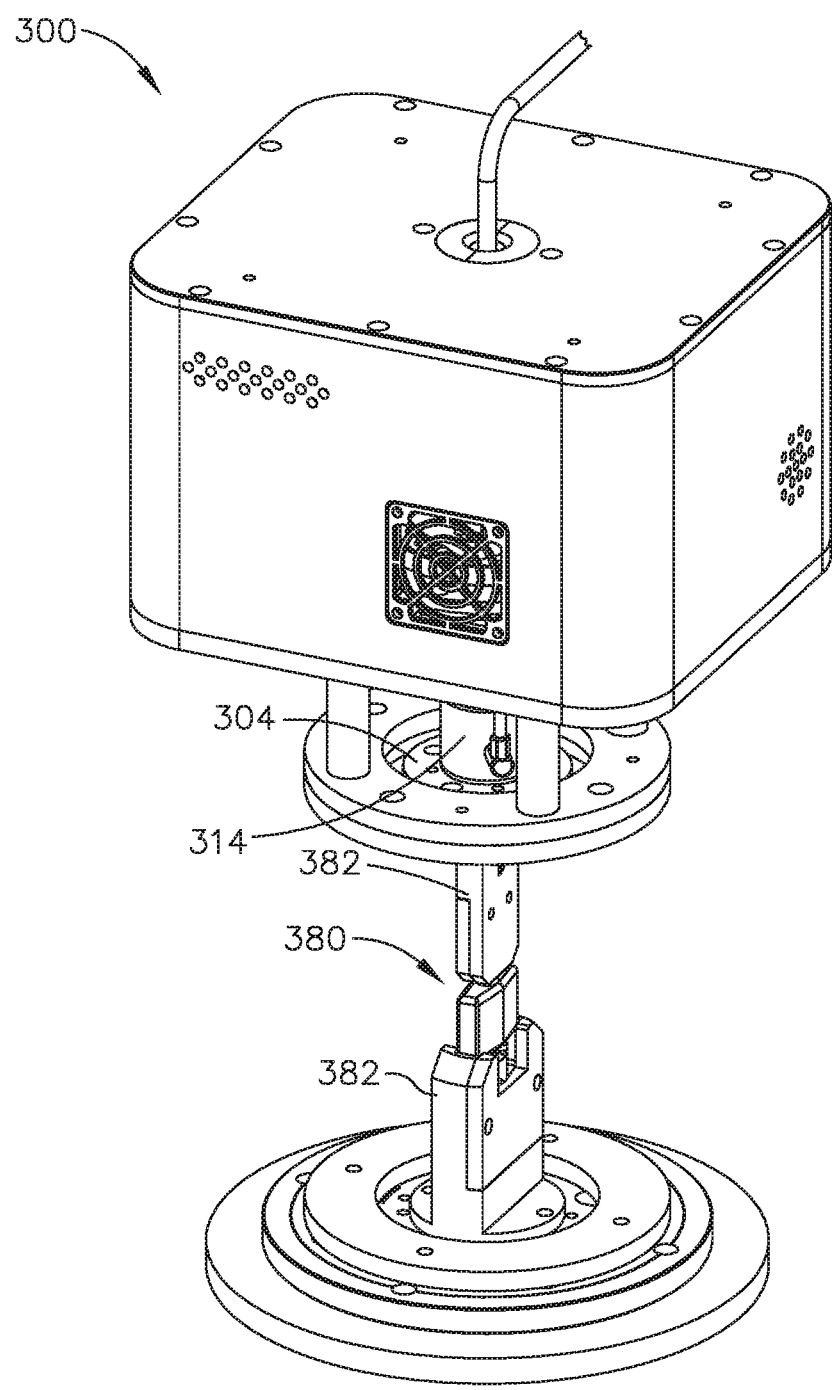

FIG. 11A depicts the testing fixture 300 in an initial state. FIG. 11B depicts the testing fixture 300 after the linear actuator assembly has driven the key into the lock by advancing the key in the direction indicated by arrow 350. As is to be appreciated, the distance of travel can be defined by the motion profile to coordinate with the particular size of the lock and key such that the key is fully seated into the lock by the linear actuator assembly. FIG. 11C depicts the testing fixture 300 after the motor has rotated the key within the lock in the direction indicated by arrow 352. As is to be appreciated, the distance of rotation can be defined by the motion profile to coordinate with the particular amount of rotation needed to unlock the lock with the key. FIG. 11D depicts the unlocking of the lock.

During each of the depicted motions in FIGS. 11A-11D, the load cell 314 can be collecting various information, such as the amount of force needed to drive the key into the lock, the amount of torque needed to turn the key within the lock, and so forth. Additionally, in some embodiments, various components of the testing fixture 300, such as encoders, can provide real-time positional feedback data to an associated computing system (i.e., the computing system 264 of FIG. 8). The positional feedback data can comprise linear positional data and/or rotational position data, for example.

In general, it will be apparent to one of ordinary skill in the art that at least some of the embodiments described herein can be implemented in many different embodiments of software, firmware, and/or hardware. The software and firmware code can be executed by a processor or any other similar computing device. The software code or specialized control hardware that can be used to implement embodiments is not limiting. For example, embodiments described herein can be implemented in computer software using any suitable computer software language type, using, for example, conventional or object-oriented techniques. Such software can be stored on any type of suitable computer-readable medium or media, such as, for example, a magnetic or optical storage medium. The operation and behavior of the embodiments can be described without specific reference to specific software code or specialized hardware components. The absence of such specific references is feasible, because it is clearly understood that artisans of ordinary skill would be able to design software and control hardware to implement the embodiments based on the present description with no more than reasonable effort and without undue experimentation.

Moreover, the processes described herein can be executed by programmable equipment, such as computers or computer systems and/or processors. Software that can cause programmable equipment to execute processes can be stored in any storage device, such as, for example, a computer system (nonvolatile) memory, an optical disk, magnetic tape, or magnetic disk. Furthermore, at least some of the processes can be programmed when the computer system is manufactured or stored on various types of computer-readable media.

It can also be appreciated that certain portions of the processes described herein can be performed using instructions stored on a computer-readable medium or media that direct a computer system to perform the process steps. A computer-readable medium can include, for example, memory devices such as diskettes, compact discs (CDs), digital versatile discs (DVDs), optical disk drives, or hard disk drives. A computer-readable medium can also include memory storage that is physical, virtual, permanent, temporary, semi-permanent, and/or semi-temporary.

A "computer," "computer system," "host," "server," or "processor" can be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein can include memory for storing certain software modules used in obtaining, processing, and communicating information. It can be appreciated that such memory can be internal or external with respect to operation of the disclosed embodiments.

In various embodiments disclosed herein, a single component can be replaced by multiple components and multiple components can be replaced by a single component to perform a given function or functions. Except where such substitution would not be operative, such substitution is within the intended scope of the embodiments. The computer systems can comprise one or more processors in communication with memory (e.g., RAM or ROM) via one or more data buses. The data buses can carry electrical signals between the processor(s) and the memory. The processor and the memory can comprise electrical circuits that conduct electrical current. Charge states of various components of the circuits, such as solid state transistors of the processor(s) and/or memory circuit(s), can change during operation of the circuits.

Some of the figures can include a flow diagram. Although such figures can include a particular logic flow, it can be appreciated that the logic flow merely provides an exemplary implementation of the general functionality. Further, the logic flow does not necessarily have to be executed in the order presented unless otherwise indicated. In addition, the logic flow can be implemented by a hardware element, a software element executed by a computer, a firmware element embedded in hardware, or any combination thereof.

The foregoing description of embodiments and examples has been presented for purposes of illustration and description. It is not intended to be exhaustive or limiting to the forms described. Numerous modifications are possible in light of the above teachings. Some of those modifications have been discussed, and others will be understood by those skilled in the art. The embodiments were chosen and described in order to best illustrate principles of various embodiments as are suited to particular uses contemplated. The scope is, of course, not limited to the examples set forth herein, but can be employed in any number of applications and equivalent devices by those of ordinary skill in the art. Rather it is hereby intended the scope of the invention to be defined by the claims appended hereto.

We claim:

1. A system, comprising:
    a testing fixture, the testing fixture comprising:
        a first plate;
        a second plate, wherein the plate is spaced from the first plate along a longitudinal axis;
        a control system;
        a mounting assembly;
        a linear actuator assembly communicatively coupled to the control system, wherein the linear actuator assembly comprises an actuator that is operatively coupled to the mounting assembly and facilitates selective translation of the mounting assembly along the longitudinal axis relative to the first plate;
        a motor communicatively coupled to the control system, wherein the motor is operatively coupled to the mounting assembly; and
        a load cell operatively coupled to the mounting assembly, wherein the load cell is communicatively coupled to the control system; and
    wherein the motor facilitates collective rotation of the mounting assembly, the load cell, and the linear actuator assembly about the longitudinal axis relative to the first and second plates.

2. The system of claim 1, wherein a target scan zone is defined between the first and second plates.

3. The system of claim 2, wherein the testing fixture further comprises:
    a shroud positioned between the first plate and the second plate, wherein the mounting assembly, linear actuator assembly, and the linear actuator assembly collective within the shroud.

4. The system of claim 2, wherein the testing fixture further comprises:
    at least one spacer rod extending from the first plate to the second plate.

5. The system of claim 1, wherein the first plate and is annular ring defining a central opening, the testing fixture further comprises:
    a rotating assembly, wherein the rotating assembly is selectively rotatable about the longitudinal axis, wherein the rotating assembly comprises:
        a slip ring connector;
        the mounting assembly;
        the linear actuator assembly;
        the load cell; and
    wherein the rotating assembly is in electrical communication with a power source through the slip ring connector, and wherein a least a portion of the rotating assembly passes through the central opening of the first plate.

6. The system of claim 5, wherein the slip ring connecter defines a slip ring axis of rotation, and wherein the slip ring axis of rotation is parallel to the longitudinal axis.

7. The system of claim 1, further comprising a rotating platform operatively coupled to the motor and the mounting assembly to facilitate selective rotation of the mounting assembly about the longitudinal axis with the motor.

8. The system of claim 7, wherein the rotating platform comprises any of a spur gear and a worm gear.

9. The system of claim 7, wherein the linear actuator assembly is mounted to the rotating platform.

10. The system of claim 1, further comprising:
    a digital image acquisition system defining an enclosure, wherein the testing fixture is positioned within the enclosure.

11. The system of claim 10, wherein the digital image acquisition system is a computer tomography (CT) scanner comprising an emitter and a detector, and wherein the testing fixture is positioned between the emitter and the detector.

12. The system of claim 10, wherein the digital image acquisition system is an X-ray imaging machine.

13. The system of claim 1, further comprising:
    a computing system in communication with the control system of the testing fixture, wherein the computing system comprises a user interface for receiving a motion profile, wherein the motion profile defines a rotation parameter for the mounting assembly and a linear actuation parameter of the mounting assembly.

14. The system of claim 13, wherein the computing system comprises a mobile communications device in wireless communication with the control system.

15. The system of claim 13, wherein the computing system is configured to:
    communicate with the control system to control the mounting assembly based on the motion profile and receive data collected by the load cell.

16. The system of claim 15, wherein the computing system is configured to:
    receive positional feedback data from the control system, wherein the positional feedback data comprises linear positional data and rotational positional data.

17. The system of claim 15, wherein the data collected by the load cell comprises torsional data and linear data.

18. The system of claim 1, comprising a part adaptor, wherein the part adaptor selectively couples to the mounting assembly.

19. A testing fixture comprising:
    a first plate;
    a second plate, wherein the plate is spaced from the first plate along a longitudinal axis;
    a control system;
    a mounting assembly;

a load cell operatively coupled to the mounting assembly, wherein the load cell is communicatively coupled to the control system;
one or more motion drivers communicatively coupled to the control system, wherein the one or more motion drivers comprise any of (i) a linear actuator assembly comprising an actuator that is operatively coupled to the mounting assembly and facilitates selective translation of the mounting assembly along the longitudinal axis relative to the first plate and (ii) a motor operatively coupled to the mounting assembly that facilitates collective rotation of the mounting assembly, the load cell, and the linear actuator assembly about the longitudinal axis; and
wherein a component of the one or more motion drivers is rotatable about the longitudinal axis relative to the first and second plates; and
wherein the one or more motion drivers execute a motion profile.

20. A system, comprising:
a digital image acquisition system defining an enclosure; and
a testing fixture is positioned within the enclosure, wherein the testing fixture comprises:
a first plate;
a second plate, wherein the plate is spaced from the first plate along a longitudinal axis;
a control system;
a mounting assembly;
a load cell operatively coupled to the mounting assembly, wherein the load cell is communicatively coupled to the control system; and
a linear actuator assembly communicatively coupled to the control system, wherein the linear actuator assembly comprises an actuator that is operatively coupled to the mounting assembly and facilitates selective translation of the mounting assembly and load cell along the longitudinal axis relative to the first plate, wherein the linear actuator assembly is rotatable about the longitudinal axis relative to the first and second plates, and a motor is communicatively coupled to the control system, wherein the motor is operatively coupled to the mounting assembly and facilitates selective rotation of the mounting assembly, the load cell, and the linear actuator assembly about the longitudinal axis relative to the first and second plates.

21. A system, comprising:
a computing system in communication with a testing fixture;
the testing fixture comprising:
a first plate;
a second plate, wherein the plate is spaced from the first plate along a longitudinal axis;
a control system;
a rotatable mounting assembly;
a load cell operatively coupled to the rotatable mounting assembly, wherein the load cell is communicatively coupled to the control system; and
a linear actuator assembly comprising an actuator, wherein the linear actuator assembly is coupled to the rotatable mounting assembly, wherein the actuator of the linear actuator assembly facilitates selective translation of the mounting assembly along the longitudinal axis relative to the first plate, and wherein the rotatable mounting assembly, the linear actuator assembly, and the actuator are rotatable about the longitudinal axis relative to the first and second plates,
wherein the linear actuator assembly executes a motion profile provided by the computing system.

22. A system, comprising:
a computing system in communication with a testing fixture;
the testing fixture comprising:
a first plate;
a second plate, wherein the plate is spaced from the first plate along a longitudinal axis;
a control system;
a rotating assembly, wherein the rotating assembly is selectively rotatable about the longitudinal axis relative to the first and second plates, wherein the rotating assembly comprises:
a slip ring connector, wherein the rotating assembly is in electrical communication with a power source through the slip ring connector;
a mounting assembly;
a linear actuator assembly; and
a load cell operatively coupled to the mounting assembly, wherein the load cell is communicatively coupled to the control system;
a motor operatively coupled to the mounting assembly that facilitates selective rotation of the mounting assembly about the longitudinal axis relative to the first and second plates; and
wherein the motor executes a motion profile provided by the computing system.

* * * * *

UNITED STATES PATENT AND TRADEMARK OFFICE
CERTIFICATE OF CORRECTION

PATENT NO. : 11,733,181 B1
APPLICATION NO. : 16/876512
DATED : August 22, 2023
INVENTOR(S) : James Anthony Topich et al.

Page 1 of 1

It is certified that error appears in the above-identified patent and that said Letters Patent is hereby corrected as shown below:

In the Claims

Column 9, Claim 3, Lines 62-63, change "and the linear actuator assembly collective within the shroud" to --and the mounting assembly collectively rotate within the shroud--;

Column 10, Claim 5, Lines 1-2, change "wherein the first plate and is annular ring defining a central opening" to --wherein the first plate is an annular ring defining a central opening--;

Column 12, Claim 21, Line 3, change "wherein the plate is spaced" to --wherein the second plate is spaced--.

Signed and Sealed this
Twenty-first Day of November, 2023

Katherine Kelly Vidal
*Director of the United States Patent and Trademark Office*